(12) United States Patent
Grancharov et al.

(10) Patent No.: US 8,831,959 B2
(45) Date of Patent: Sep. 9, 2014

(54) TRANSFORM AUDIO CODEC AND METHODS FOR ENCODING AND DECODING A TIME SEGMENT OF AN AUDIO SIGNAL

(75) Inventors: Volodya Grancharov, Solna (SE); Sigurdur Sverrisson, Kungsängen (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 374 days.

(21) Appl. No.: 13/183,950

(22) Filed: Jul. 15, 2011

(65) Prior Publication Data
US 2013/0006646 A1    Jan. 3, 2013

(30) Foreign Application Priority Data
Jun. 30, 2011   (WO) ................ PCT/SE2011/050889

(51) Int. Cl.
*G10L 19/00*   (2013.01)
*H03M 5/00*   (2006.01)
*G10L 19/12*   (2013.01)
*G01L 19/02*   (2006.01)

(52) U.S. Cl.
CPC ............ *G01L 19/02* (2013.01); *G01L 19/0212* (2013.01); *G01L 19/032* (2013.01)
USPC .............................. 704/500; 341/55; 704/222

(58) Field of Classification Search
CPC .................................. G10L 19/12; H03M 7/00
USPC ......................................................... 704/500
See application file for complete search history.

(56) References Cited

U.S. PATENT DOCUMENTS

| | | | |
|---|---|---|---|
| 6,728,669 B1 * | 4/2004 | Benno | 704/219 |
| 6,735,339 B1 * | 5/2004 | Ubale | 382/232 |
| 8,149,144 B2 * | 4/2012 | Mittal et al. | 341/51 |
| 2007/0140499 A1 * | 6/2007 | Davis | 381/23 |
| 2007/0271094 A1 * | 11/2007 | Ashley et al. | 704/222 |
| 2009/0024398 A1 * | 1/2009 | Mittal et al. | 704/500 |
| 2010/0017204 A1 * | 1/2010 | Oshikiri et al. | 704/222 |
| 2010/0286991 A1 * | 11/2010 | Hedelin et al. | 704/500 |
| 2011/0095920 A1 * | 4/2011 | Mittal et al. | 341/55 |

(Continued)

OTHER PUBLICATIONS

Sang_Uk Ryu et al., Encoder assisted frame loss concealment for MPEGE-ACC Decoder, 2006, ICASSP, pp. 169-172.*

(Continued)

*Primary Examiner* — James Wozniak
*Assistant Examiner* — Timothy Nguyen
(74) *Attorney, Agent, or Firm* — Coats & Bennett, PLLC

(57) ABSTRACT

Methods and devices for efficient encoding/decoding of a time segment of an audio signal. Methods comprise deriving an indicator, z, of the position in a frequency scale of a residual vector associated with the time segment of the audio signal, and deriving a measure, Φ, related to the amount of structure of the residual vector. The methods further comprise determining whether a predefined criterion involving the measure Φ, the indicator z and a predefined threshold Θ, is fulfilled, which corresponds to estimating whether a change of sign of at least some of the non-zero coefficients of the residual vector would be audible after reconstruction of the audio signal time segment. The amplitude of the coefficients of the residual vector is encoded, and the signs of the coefficients of the residual vector are encoded only when it is determined that the criterion is fulfilled, and thus that a change of sign would be audible.

22 Claims, 7 Drawing Sheets

(56) References Cited

U.S. PATENT DOCUMENTS

2011/0156932 A1* 6/2011 Mittal et al. .................. 341/51
2011/0295598 A1* 12/2011 Yang et al. .................. 704/205
2012/0101813 A1* 4/2012 Vaillancourt et al. ......... 704/206

OTHER PUBLICATIONS

Ryu, S., et al., "An MDCT Domain Frame-Loss Concealment Technique for MPEG Advanced Audio Coding", 2007 IEEE International Conference on Acoustics, Speech, and Signal Processing, Apr. 15, 2007, Honolulu, HI, pp. I-273-I-276.

Ryu, S., et al.,"A Frame Loss Concealment Technique for MPEG-AAC*", AES Convention 120, May 20-23, 2006, Presented at the 120th Convention, Paris, France, pp. 1-13.

Ryu, S., et al.,"Encoder Assisted Frame Loss Concealment for MPEG-AAC Decoder", IEEE International Conference, Toulouse, France, May 14-19, 2006, pp. V-163-V-172.

Ito, A., et al.,"Packet Loss Concealment for MDCT-based Audio Codec using Correlaton-Based Side Information", International Conference on Intelligent Information Hiding and Multimedia Signal Processing, IEEE Computer Society,Aug. 15, 2008, pp. 612-615.

Chen, J-H.,"A High-Fidelity Speech and Audio Codec With Low Delay and Low Complexity", IEEE Acoustics, Speech, and Signal Processing, IEEE International Conference, Piscataway, NJ, Jun. 5-9, 2000, pp. 1161-1164.

* cited by examiner

TRANSFORM AUDIO CODEC AND METHODS FOR ENCODING AND DECODING A TIME SEGMENT OF AN AUDIO SIGNAL

RELATED APPLICATIONS

This application claims priority to International Patent Application PCT/SE2011/050889, filed Jun. 30, 2011.

TECHNICAL FIELD

The invention relates to the encoding and decoding of a time segment of an audio signal, and especially to encoding and decoding in a transform audio codec.

BACKGROUND

It is previously known to use transform domain coding schemes, such as the one described in [1]. Below, a high-level overview of such transform domain coding schemes will be given.

On a block-by-block basis, the waveform to be encoded is transformed to the frequency domain. One commonly used transform used for this purpose is the so-called Modified Discrete Cosine Transform (MDCT). The frequency domain transform vector thus obtained is split into spectrum envelope (slowly varying energy) and spectrum residual. The spectrum residual is obtained by normalizing the obtained frequency domain vector with said spectrum envelope. The spectrum envelope is quantized, and quantization indices are transmitted to the decoder. Next, the quantized spectrum envelope is used as an input to a bit distribution algorithm, and bits for encoding of the residual vectors are distributed based on the characteristics of the spectrum envelope. As an outcome of this step, a certain number of bits are assigned to different parts of the residual (residual vectors or "sub-vectors"). Some residual vectors do not receive any bits and have to be noise-filled or bandwidth-extended; an example of this is illustrated in FIG. 1. Typically, the coding of residual vectors is a two step procedure; first, the amplitudes of the vector elements are coded, and next the sign (which should not be confused with "phase", which is associated with, for example, Fourier transforms) of the non-zero elements is encoded. An example of this is illustrated in FIG. 2. Quantization indices for the residual's amplitude and sign are transmitted to the decoder, where residual and spectrum envelope are combined, and finally transformed back to time domain.

However, when the number of bits available for the encoding are limited, such as at low or moderate bit-rates, the result of the encoding may be unsatisfactory.

SUMMARY

It would be desirable to achieve an improved transform domain coding scheme. It is an object of the invention to enable efficient encoding in a transform audio encoder and corresponding decoding in a transform audio decoder.

According to a first aspect, a method is provided in a transform audio encoder for encoding a time segment of an audio signal. The method comprises deriving an indicator, z, of the position in a frequency scale of a residual vector associated with the time segment of the audio signal, and deriving a measure, $\Phi$, related to the amount of structure of the residual vector. The method further comprises determining whether a predefined criterion involving the measure $\Phi$, the indicator z and a predefined threshold $\Theta$, is fulfilled, which corresponds to estimating whether a change of sign of at least some of the non-zero coefficients of the residual vector would be audible after reconstruction of the audio signal time segment. The respective amplitude of the coefficients of the residual vector is encoded, and the signs of the coefficients of the residual vector are encoded only when it is determined that the criterion is fulfilled, and thus that a change of sign would be audible.

According to a second aspect, a transform audio encoder is provided for encoding a time segment of an audio signal. The transform audio encoder comprises a functional unit, which is adapted to derive an indicator, z, of the position in a frequency scale of a residual vector associated with the time segment of the audio signal, and to derive a measure, $\Phi$, which is related to the amount of structure of the residual vector. The transform audio encoder further comprises a functional unit, which is adapted to determine whether a predefined criterion involving the measure $\Phi$, the indicator z and a predefined threshold $\Theta$, is fulfilled. The transform audio encoder further comprises a functional unit, which is adapted to encode the amplitude of the coefficients of the residual vector, and to encode the respective sign of the coefficients of the residual vector only when it is determined that the criterion is fulfilled.

The above method and transform audio encoder may be used for enabling efficient transform encoding of audio signals. When applying the above described method and transform audio encoder, fewer bits may be required for encoding an audio signal, as compared to when using previously known transform audio encoders. Even though fewer bits are used for encoding, the perceived quality of the reconstructed audio signal is not degraded, as compared to when using previously known transform audio encoders. On the contrary, the bits which are saved may instead be used for encoding parts of the audio signal of which the perceived quality could be improved when having access to an increased bit budget for encoding. Thus, the above method and arrangement enables a more efficient bit distribution scheme for transform-domain audio codecs, since the bits may be shifted towards signal parameters in the audio signal, which are more critical to the perceived quality of the reconstructed audio signal. Thus, an overall quality improvement may be achieved while preserving a certain bit-budget.

According to a third embodiment, a method is provided in a transform audio decoder for decoding an encoded time segment of an audio signal. The method comprises decoding the amplitudes of the coefficients of a residual vector of a segment of a transform vector associated with the time segment of the audio signal. The method further comprises deriving an indicator, z, of the position in a frequency scale of the residual vector, and deriving a measure, $\Phi$, related to the amount of structure of the residual vector. The method further comprises determining whether a predefined criterion involving the measure $\Phi$, the indicator z and a predefined threshold $\Theta$, is fulfilled, which corresponds to estimating whether a change of sign of at least some of the non-zero coefficients of the residual vector would be audible after reconstruction of the audio signal time segment. When it is determined that the criterion is fulfilled, which corresponds to that a change of sign would be audible in the reconstructed audio signal, the signs of the coefficients of the residual vector are encoded. When it is determined that the criterion is not fulfilled, and thus that a change of sign would not be audible in the reconstructed audio signal, a respective random sign for the non-zero coefficients of the residual vector is generated.

According to a fourth embodiment a transform audio decoder is provided for decoding of an encoded time segment of an audio signal. The transform audio decoder comprises a functional unit, which is adapted to decode the respective amplitude of the coefficients of a residual vector of a segment of a transform vector associated with the time segment of the audio signal. The transform audio decoder further comprises a functional unit, which is adapted to derive an indicator, z, of the position in a frequency scale of the residual vector, and to derive a measure, $\Phi$, related to the amount of structure of the residual vector. The transform audio decoder further comprises a functional unit, which is adapted to determine whether a predefined criterion involving the measure $\Phi$, the indicator z and a predefined threshold $\Theta$, is fulfilled. The transform audio decoder is further adapted to decode the sign of the non-zero coefficients of the residual vector only when the criterion is determined to be fulfilled. The transform audio decoder further comprises a functional unit, which is adapted to generate a respective random sign for the non-zero coefficients of the residual vector when it is determined that the criterion is not fulfilled.

The above method in a decoder and transform audio decoder/codec could be used for decoding audio signals which are encoded using the method and transform audio encoder described above, and thus enables the efficient encoding and improved bit-distribution discussed above.

The above methods and transform audio encoder/decoder, or codec, may be implemented in different embodiments. In some embodiments, the measure, $\Phi$, is a so-called spectral flatness measure. The predefined criterion may be formulated as $\omega_1\Phi+\omega_2 z \leq \Theta(b)$, where $\omega_1$ and $\omega_2$ are scaling factors; and $\Theta$ is a threshold which depends on the bitrate b of the codec (encoder/decoder). The scaling factors $\omega_1$, $\omega_2$ and the threshold $\Theta$ may be, at least partly, derived from empirical perception data.

Further, the threshold $\Theta$ may be configured to increase with increased bitrate of the codec. This gives the advantage that the encoding is adapted to the amount of bits which are available for encoding. For example, at high bit rates, the bit-budget may allow that the signs of the non-zero coefficients of most or even all residual vectors are encoded. If the threshold $\Theta$ is configured to increase with an increased bit rate (and thus bit budget), the threshold $\Theta$ may be configured such that the criterion will be fulfilled for most (or all) residual vectors at high bit rates, while for lower bit rates (and thus more restricted bit-budgets), more residual vectors will be amplitude-encoded, but be assigned random signs in the decoder.

Further, the measure, $\Phi$, could be derived only when the indicator, z, indicates that the residual vector is located at frequencies above a predefined cross-over frequency $Z_c$, which depends on the bitrate b of the codec (encoder/decoder). Thereby, the rather complex calculation of $\Phi$ could be avoided for residual vectors of which a change of sign of some of the coefficients would most probably be audible in a reconstructed audio signal. Thus, computational resources may be saved. A cross-over frequency which increases with an increased bit rate and bit budget ensures that the signs of more amplitude-encoded residual vectors will be encoded when the bit budget allows for it.

In embodiments where a Factorial Pulse Coding (FPC) scheme is used for encoding of the residual vector, the measure $\Phi_{FPC}$ could be derived in a very computationally efficient way of low complexity, namely as:

$$\Phi_{FPC} = \frac{N_{NZP}}{N_{TP}}$$

where $N_{NZP}$ is the number of non-zero positions in the residual vector and $N_{TP}$ is the total number of pulses in the residual vector.

The embodiments above have mainly been described in terms of a method. However, the description above is also intended to embrace embodiments of a transform audio encoder and a transform audio decoder, each adapted to enable the performance of the above described features. The different features of the exemplary embodiments above may be combined in different ways according to need, requirements or preference.

BRIEF DESCRIPTION OF THE DRAWINGS

The invention will now be described in more detail by means of exemplifying embodiments and with reference to the accompanying drawings, in which.

DETAILED DESCRIPTION

In the conventional schemes outlined above, the bit distribution to different residual vectors is entirely based on the spectrum envelope. The new scheme for transform coding described herein enables saving of bits based on analysis of the residual vectors, and the scheme may be applied in transform domain coding schemes where the amplitude and sign related to residual vectors are coded sequentially. The new scheme enables a more efficient coding of certain regions of audio signals, as compared to conventional methods, by enabling saving of bits that were previously spent on coding characteristics in particular residual vectors, which characteristics are, in fact, not audible in the original and/or reconstructed audio signal.

By "residual vector" is herein meant a part or segment of the residual of a transform vector related to a time segment of an audio signal. Thus, a residual vector could also be denoted "residual sub-vector", or similar.

The term "transform audio codec" or "transform codec" embraces an encoder-decoder pair, and is the term which is commonly used in the field. Within this disclosure, the terms "transform audio encoder" and "transform audio decoder"

are used, in order to separately describe the functions/parts of a transform codec. The terms "transform audio encoder" and "transform audio decoder" could thus be exchanged for, or interpreted as, the term "transform audio codec" or "transform codec". The encoder and decoder operate at the same bitrate. Thus, the expressions "the bitrate of the encoder" or "the bitrate of the decoder" could be exchanged for, or interpreted as, "the bitrate of the codec".

Figure 1:
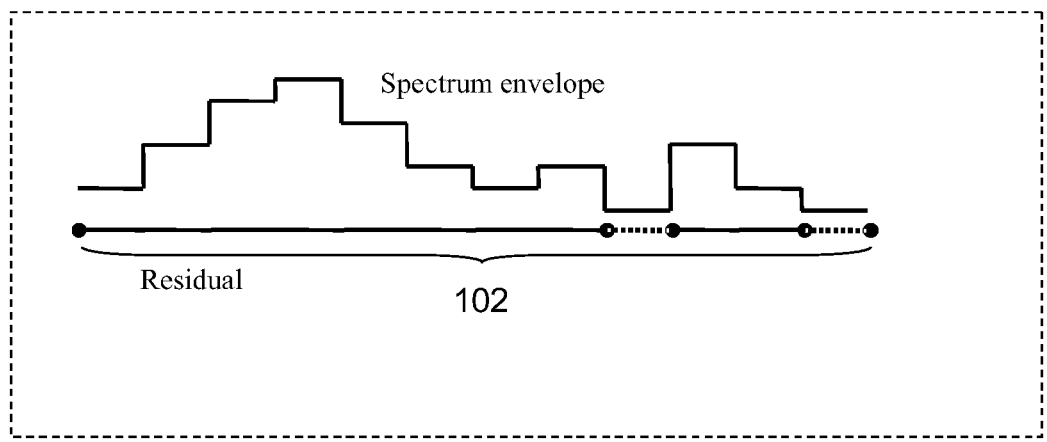
FIG. 1 is a schematic diagram illustrating a spectrum envelope and the encoding of a corresponding residual, according to the prior art.

FIG. 1 illustrates the spectrum envelope of a transform vector corresponding to a time segment of an audio signal. Further, in FIG. 1, the encoding of a corresponding residual is illustrated by the line 102. The solid parts of the line illustrate residual vectors which are encoded, and the dotted parts of the line illustrate the residual vectors which are not encoded, but which are instead noise-filled or bandwidth-extended. The sections that are noise-filled or bandwidth-extended are typically low energy residual vectors. No bits are spent on encoding these residual vectors, but instead the receiver/decoder fills the "gap" with noise, or copies another residual vector (or sub-vector), such as a neighboring vector (or sub-vector), which is used in place of the uncoded and thus "missing" residual vector.

Figure 2:
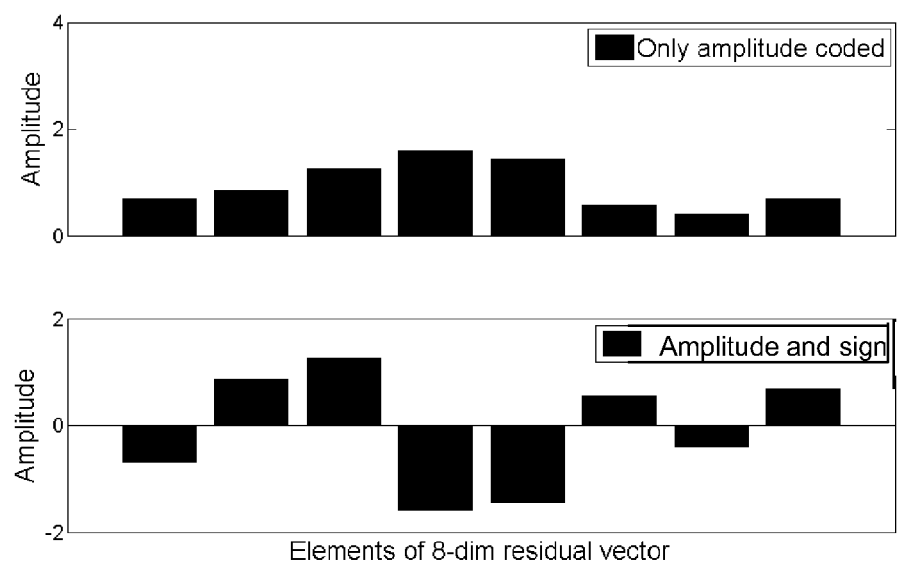
FIG. 2 is a diagram illustrating the two stages of residual quantization. The plot at the top illustrates the outcome of the first stage of residual quantization, where the amplitude of each vector element is coded irrespective of the sign. The plot at the bottom illustrates the second quantization step, where the sign is added to the already coded amplitude. Adding the sign is equivalent to multiplying with +1 or −1.

FIG. 2 illustrates the encoding of a quantized residual vector comprising eight elements or frequency bins. The upper plot shows the amplitude of the elements of the residual vector, which is encoded in a first encoding step. The lower plot shows the amplitude and also the sign of the eight elements. The sign of each element is encoded in a second encoding step. A "residual vector" could comprise different amounts of elements depending, for example, on which codec is used or the location in frequency of the residual vector.

As previously mentioned, there are regions of audio signals that may be more efficiently encoded, and thus bits could be saved, which could be better used elsewhere. However, in order to treat these regions in a special way, they have to be identified, which is not a trivial problem. Below, a scheme for identifying or selecting such regions in an audio signal and for encoding these regions in an efficient manner will be described. The more regions that could be more efficiently coded, the more bits can be saved. However, the bits should preferably be saved without causing any perceptual degradation of the reconstructed audio signal.

The human auditory system is very sophisticated and has certain properties which are still unexplained, in spite of numerous attempts made by researchers, such as in the field of perception, to find an explanation, for example, through the performing of various fundamental listening tests. One such still unexplained property is the significance of the phase in audio signals. However, fundamental listening tests where different constructed audio stimuli with varying phase have been presented to listeners have resulted in some basic knowledge. For example, one feature of the human auditory system is that "noise-like" signal segments sound the same to a listener, even if the original phase of the signal segments is changed. In other words, it is very difficult for a human listener to perceive the difference between different realizations of noise. Further, the higher the frequency of an audio signal segment, the less sensitive the human auditory system is to phase differences, which thus become less audible with increased frequency.

In the herein suggested scheme for improving the efficiency of transform audio coding, the above described properties of the human auditory system are exploited and utilized for encoding of an audio signal. In transform audio coding, the sign of the transform coefficients is related to the phase of the audio signal. The properties are utilized by that only the amplitude and not the sign of the non-zero elements or coefficients in a residual vector is encoded when it is anticipated that a change of sign of at least some of the non-zero coefficients of the residual vector would not be audible after reconstruction of the audio signal time segment. This could also be expressed as that both the amplitude and the sign of non-zero elements or coefficients in a residual vector are encoded only when it is anticipated that a change of sign of at least some of the non-zero coefficients of the residual vector would be audible after reconstruction of the audio signal time segment.

The identification and selection of residual vectors for which encoding of the sign could be omitted without perceptually degrading the reconstructed audio signal, and of which residual vectors thus the amplitude but not the sign should be encoded, is based on two parameters:

a measure, $\Phi$, which reflects the "structure" of the residual vector, e.g., a so-called "flatness measure" (where "flatness" refers to the distribution of energy over frequency). Preferably, the measure $\Phi$ should be possible to calculate or derive based on an "amplitude-coded" residual vector in a decoder, such that no bits need to be spent on signaling this measure from the encoder to the decoder. In this description, the measure $\Phi$ is a value between 0 and 1 ($\Phi \in (0,1)$), where noise-like signal segments having a low amount of structure, such as in white noise, renders a value towards $\Phi=1$, and signal segments having a high amount of structure, such as in a signal comprising tones (sinusoids) in a few frequencies, renders a value towards $\Phi=0$.

a frequency index, $z_i$, of the particular residual vector i. The frequency index $z_i$ should indicate where, on a frequency scale, the residual vector i is positioned. In the following description it is assumed that the residual vectors are ordered, for example such that: a vector with index z=1 occupies, for example, frequencies 1-200 Hz, a vector with index z=2 occupies frequencies, for example, 201-400 Hz, and a vector with index z=3 occupies frequencies, for example, 401-600 Hz, etc. So, here, a larger value of the frequency index $z_i$ corresponds to a residual vector i, which is centered at higher frequencies (than a residual vector having a lower frequency index).

These parameters, $\Phi$ and z, reflect the two properties of the human auditory system discussed above in that:
$\Phi$ indicates how noise-like a signal is, which reflects the property that "noise-like" signal segments sound the same even if their original phase is replaced;
z indicates position on a frequency scale, which reflects the property that phase differences are less audible at higher frequencies.

The so-called flatness measure is related to the distribution of energy over frequency and to the amount of structure in the residual vector and is defined as:

$$\Phi = \frac{\exp\left(\frac{1}{N}\sum_{n=1}^{N}\log(x_n)\right)}{\frac{1}{N}\sum_{n=1}^{N}x_n} \quad (1)$$

where $x_n$ is the amplitude-coded residual vector (i.e. no sign needed, cf. first plot in FIG. 2) of dimension N=8. From the definition of the flatness measure follows that $\Phi \in (0,1)$, and $\Phi \to 0$ when amount of structure increases.

Since sign becomes more important with decreasing $\Phi$ (towards higher amount of structure) and decreasing z (towards lower audible frequencies), and vice versa, the decision whether to encode the sign or not can be made on a vector-by-vector basis, such as according to equation (2) below, such that the sign is coded when a certain criterion is fulfilled, and the sign is not coded when the criterion is not fulfilled (or vice versa, depending on how the criterion is formulated):

$$\begin{cases} \text{if } \omega_1\Phi + \omega_2 z \leq \Theta(b) \\ \quad FLAG = \text{Coded\_Phase} \\ \text{else} \\ \quad FLAG = \text{Random\_Phase} \\ \text{end} \end{cases} \quad (2)$$

Here, $\omega_1$ and $\omega_2$ are scaling factors, which have been empirically found. The threshold $\Theta(b)$, which is also empirically found, is here dependent on the codec's bitrate, b, where b, for example, may take on the values b∈{24,32,64,96,128} kbit/s. When $\Theta(b)$ is designed to increase with the bitrate of the codec, fewer vectors will be coded with random phase (i.e., encoded amplitude but not sign) at higher-bitrates.

The sign is perceptually relevant at low frequencies, and therefore, in practice, the sign will almost without exception be encoded below some certain frequency. Consequently, a complexity reduction can be achieved by introducing a rule saying that the flatness measure $\Phi$ should not be calculated for residual vectors below a certain frequency, Z. For example, the logic in equation (2) could be used only for residual vectors above a pre-defined "cross-over" frequency $Z_c(b)$; whereas, for residual vectors below the "cross-over" frequency $Z_c(b)$, the phase is "always" coded, without calculation of $\Phi$. This could be formulated in pseudo code as:

$$\begin{cases} \text{if } z \leq Z_c(b) \\ \quad FLAG = \text{Coded\_Phase} \\ \text{elseif } \omega_1\Phi + \omega_2 z \leq \Theta(b) \\ \quad FLAG = \text{Coded\_Phase} \\ \text{else} \\ \quad FLAG = \text{Random\_Phase} \\ \text{end} \end{cases} \quad (3)$$

In the case of using a Factorial Pulse Coding (FPC) scheme, as described, for example in [2], for residual coding, a low complexity calculation of $\Phi$ is possible, at least for low and moderate codec bitrates. Since, in FPC, an amplitude-coded residual vector consists of unit pulses added to certain positions or frequency bins/frequencies (possibly on a top of each other), the amount of structure in such a residual vector can be measured as:

$$\Phi_{FPC} = \frac{N_{NZP}}{N_{TP}} \quad (4)$$

where $N_{NZP}$ is the number of non-zero positions in the residual vector and $N_{TP}$ is the total number of pulses in the vector. Executing equation (4) in a processor involves very low complexity, as all required parameters ($N_{NZP}$ and $N_{NZP}$) are readily available in conventional FPC coding. This "approximation" or low complexity calculation of $\Phi$ is valid when a moderate number of pulses are assigned to a residual vector. $N_{NZP}$ is the number of non-zero positions in the residual vector, and $N_{TP}$ Thus, for each residual vector for which only the amplitude, and not the sign, is encoded, as many bits as non-zero coefficients in the vector may be saved, as compared to conventional methods. Saved bits could be redistributed for use, such as in encoding of other residual vectors which would benefit from an increased "encoding bit budget", in accordance with known bit distribution schemes. The actual scheme for redistribution of the bits is not part of the invention.

Figure 3:
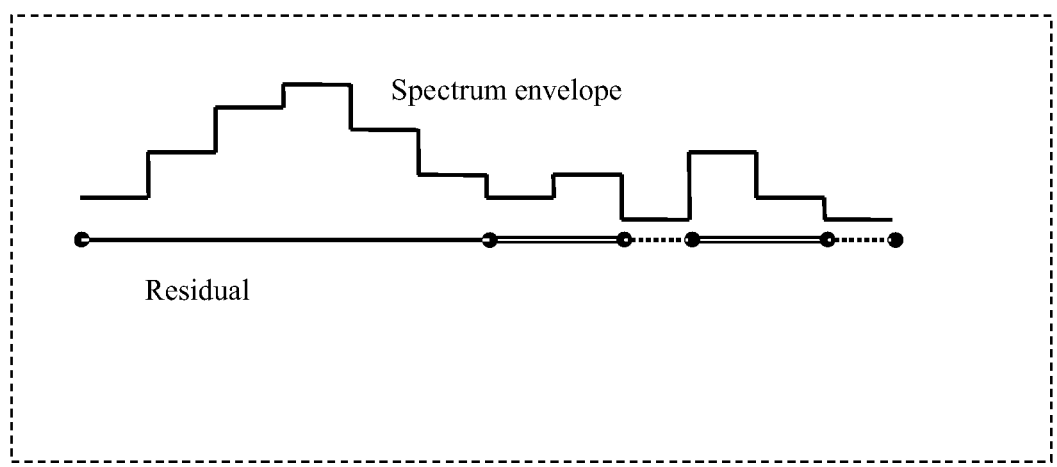
FIG. 3 is a schematic diagram illustrating a spectrum envelope and a corresponding residual, according to an exemplifying embodiment of the invention.

In FIG. 3, residual vectors for which the amplitude, but not the sign, is encoded in accordance with an exemplifying embodiment, are illustrated by a double-line. Single line and dotted line represent the same coding as in FIG. 1, i.e., coding of both amplitude and sign (single line), and no coding at all (dotted line). Thus, it can be seen from FIG. 3 that using the suggested scheme for improved encoding of residual vectors results in the saving of bits as compared to the coding illustrated in FIG. 1.

Figure 4:
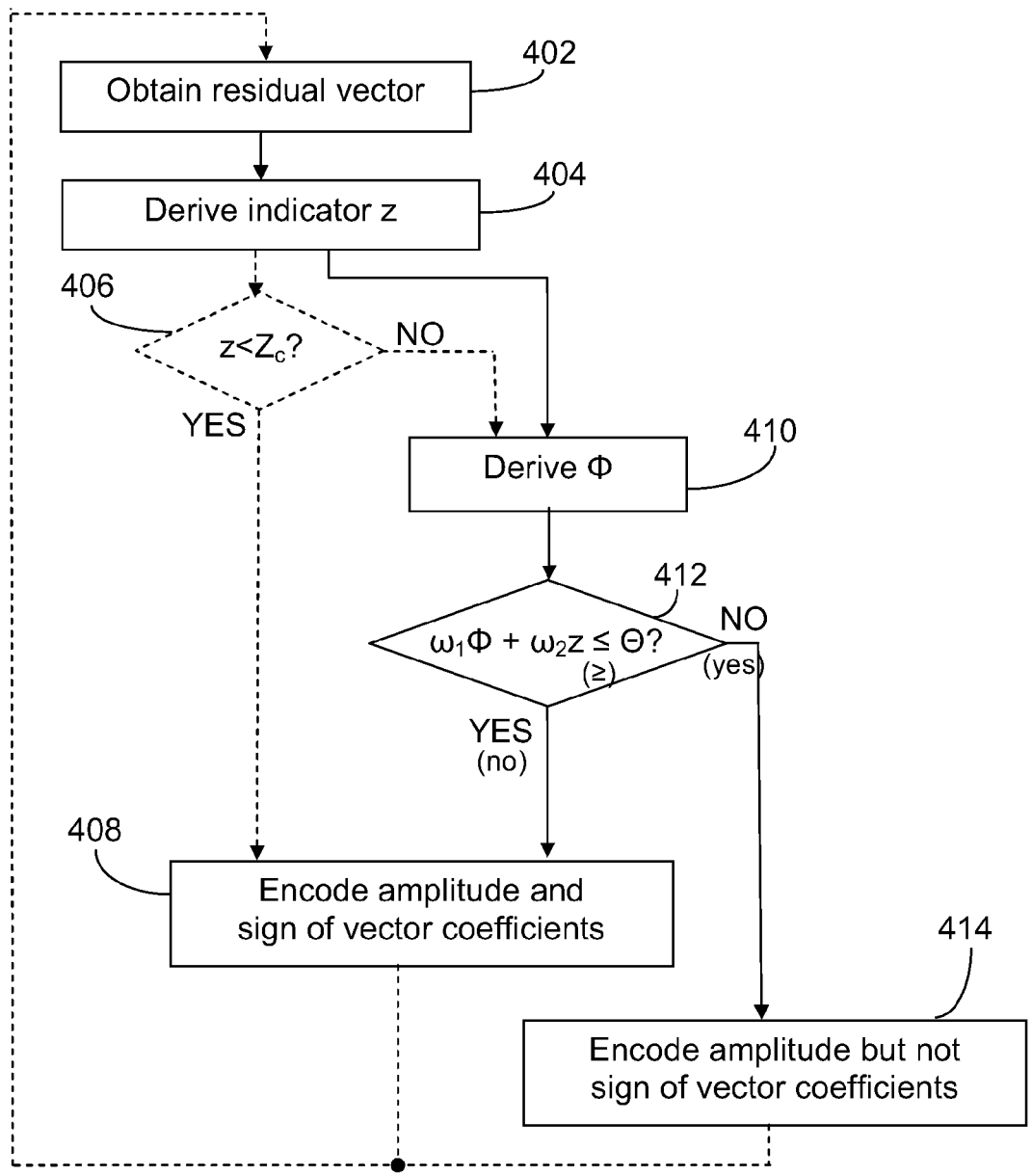
FIG. 4 is a flow chart illustrating the actions in a procedure in a transform audio encoder, according to an exemplifying embodiment.

An exemplifying embodiment of the procedure for encoding a time segment of an audio signal will be described below, with reference to FIG. 4. The procedure is suitable for use in a transform audio encoder, such as an MDCT encoder, or other encoder, where the residual vector amplitude and sign are encoded separately or sequentially. The audio signal is primarily thought to comprise speech, but could also or alternatively comprise music, for example.

Initially, a residual vector is obtained in an action 402. The residual vector is derived using any therefore suitable method, such as a method that is used in conventional MDCT codecs, and is derived from a segment of a transform vector associated with the time segment of the audio signal. It is previously known how to derive a residual vector.

Then, an indicator, z, of the position in a frequency scale of the residual vector is derived in an action 404. As previously described, z could be an integer, where a higher value of z indicates that the residual vector comprises higher frequencies, such as z=1 indicates the frequencies 1-200 Hz; z=2 indicates the frequencies 201-400 Hz, etc. Other alternatives of indexing are also possible, which alternatives would then possibly require a corresponding adjustment of other parameters described below, in order to enable correct identification of residual vectors for which the amplitude but not the sign should be encoded.

Further, the structure measure, $\Phi$, is derived in an action 410. $\Phi$ could be derived as the so-called flatness measure, which is defined in equation (1) above. In case of FPC, $\Phi$ could be derived as defined in equation (4) above. When applying a cross-over frequency $Z_c$, below which both the amplitude and sign should be encoded, it could be determined in an action 406, whether the index z of the residual vector indicates frequencies below the cross-over frequency $Z_c$ or not, and action could be taken in accordance with the result of action 406. When z is found to indicate frequencies below the cross-over frequency $Z_c$, both amplitude and sign of the residual vector are encoded in an action 408; and when z is found to indicate frequencies above the cross-over frequency $Z_c$, the measure $\Phi$ is derived in action 410.

Further, when $\Phi$ has been derived, it is determined in an action 412 whether a predefined criterion involving the measure $\Phi$, the indicator z and a predefined threshold $\Theta$, is fulfilled. The criterion should be formulated in such a way that determining whether the criterion is fulfilled corresponds to estimating whether a change of sign of at least some of the non-zero coefficients of the residual vector would be audible after reconstruction of the audio signal time segment.

Thus, when it is determined that the criterion is fulfilled, and thus that a change of sign would be audible, the amplitude and sign are encoded in an action 408. When it is determined that the criterion is not fulfilled, the amplitude, but not the sign, is encoded in an action 412. The criterion could alternatively be formulated such that amplitude and sign should be encoded when the criterion is not fulfilled, and the amplitude but not the sign should be encoded when the criterion is fulfilled. This alternative is illustrated by the operator and alternative results in parentheses in association with action 412 in FIG. 4. This alternative formulation of the criterion is considered to be covered by the formulation of the independent claims, even though they are, for reasons of legibility and clarity, directed to the first alternative.

The criterion could be formulated as: $\omega_1\Phi+\omega_2 z \leq \Theta$, where $\omega_1$ and $\omega_2$ are scaling factors; and $\Theta$ is a threshold which could depend on the bitrate b of the encoder/codec. The threshold $\Theta$ is preferably configured to increase with increasing bitrate as previously described.

The scaling factors $\omega_1$ and $\omega_2$ may be empirically found by the performance of listening tests. In the listening tests, listeners may be instructed to indicate how an audio test signal is perceived, such as whether any degradation of the signal is perceived, using test signals derived for different values of $\omega_1$ and $\omega_2$. The threshold $\Theta$ could be derived in a similar manner in therefore designed listening tests generating empirical perception data. In a particular implementation where $\Phi$ and z are scaled to be between 0 and 1, example values of $\omega_1$ and $\omega_2$ could be $\omega_1=0.2$ and $\omega_2=0.8$; and $\Theta$ could be a value between $0<\Theta<2$.

Below, an exemplifying transform audio encoder, adapted to perform the above described procedure for encoding a time segment of an audio signal will be described with reference to FIG. 5. The transform audio encoder could, for example, be an MDCT encoder, or other encoder where the residual vector amplitude and sign are encoded separately or sequentially.

The transform audio encoder 501 is illustrated as to communicate with other entities via a communication unit 502, which may be considered to comprise conventional means for data input and data output. The part of the transform audio encoder which is adapted for enabling the performance of the above described procedure is illustrated as an arrangement 500, surrounded by a dashed line. The transform audio encoder may further comprise other functional units 514, such as functional units providing regular encoder functions, and may further comprise one or more storage units 512.

The transform audio encoder 501, and/or the arrangement 500, could be implemented, for example, by one or more of: a processor or a microprocessor and adequate software, a Programmable Logic Device (PLD) or other electronic component(s).

The transform audio encoder comprises an obtaining unit 504, which is adapted to derive, receive or retrieve a residual vector of a segment of a transform vector associated with the time segment of the audio signal. Further, the transform audio encoder comprises a deriving unit 506, which is adapted to derive an indicator, z, of the position in a frequency scale of the residual vector, and a measure, $\Phi$, related to the amount of structure of the residual vector. The transform audio encoder further comprises a determining unit 508, which is adapted to determine whether a predefined criterion involving the measure $\Phi$, the indicator z and a predefined threshold $\Theta$, is fulfilled, thus estimating whether a change of sign of at least some of the non-zero coefficients of the residual vector would be audible after reconstruction of the audio signal time segment, as previously described. Further, the transform audio encoder comprises an encoding unit 510, adapted to encode the amplitude of the coefficients of the residual vector, and to encode the sign of the coefficients of the residual vector only when it is determined that the criterion is fulfilled, and thus that a change of sign would be audible.

The transform audio encoder may be adapted such that one or more of the alternatives of the procedure described above could be performed. For example, the transform audio encoder may be adapted to derive the measure, $\Phi$, as a so-called spectral flatness measure, such as $$\Phi = \frac{\exp\left(\frac{1}{N}\sum_{n=1}^{N}\log(x_n)\right)}{\frac{1}{N}\sum_{n=1}^{N}x_n}, \text{ or,}$$

in case of FPC, as:

$$\Phi_{FPC} = \frac{N_{NZP}}{N_{TP}},$$

as previously described.

The transform audio encoder may further be adapted to derive the measure, $\Phi$, only when the indicator, z, indicates that the residual vector is associated with frequencies above a predefined cross-over frequency $Z_c$. The cross-over frequency $Z_c$ could depend on the bitrate b of the encoder/codec.

Figure 6:
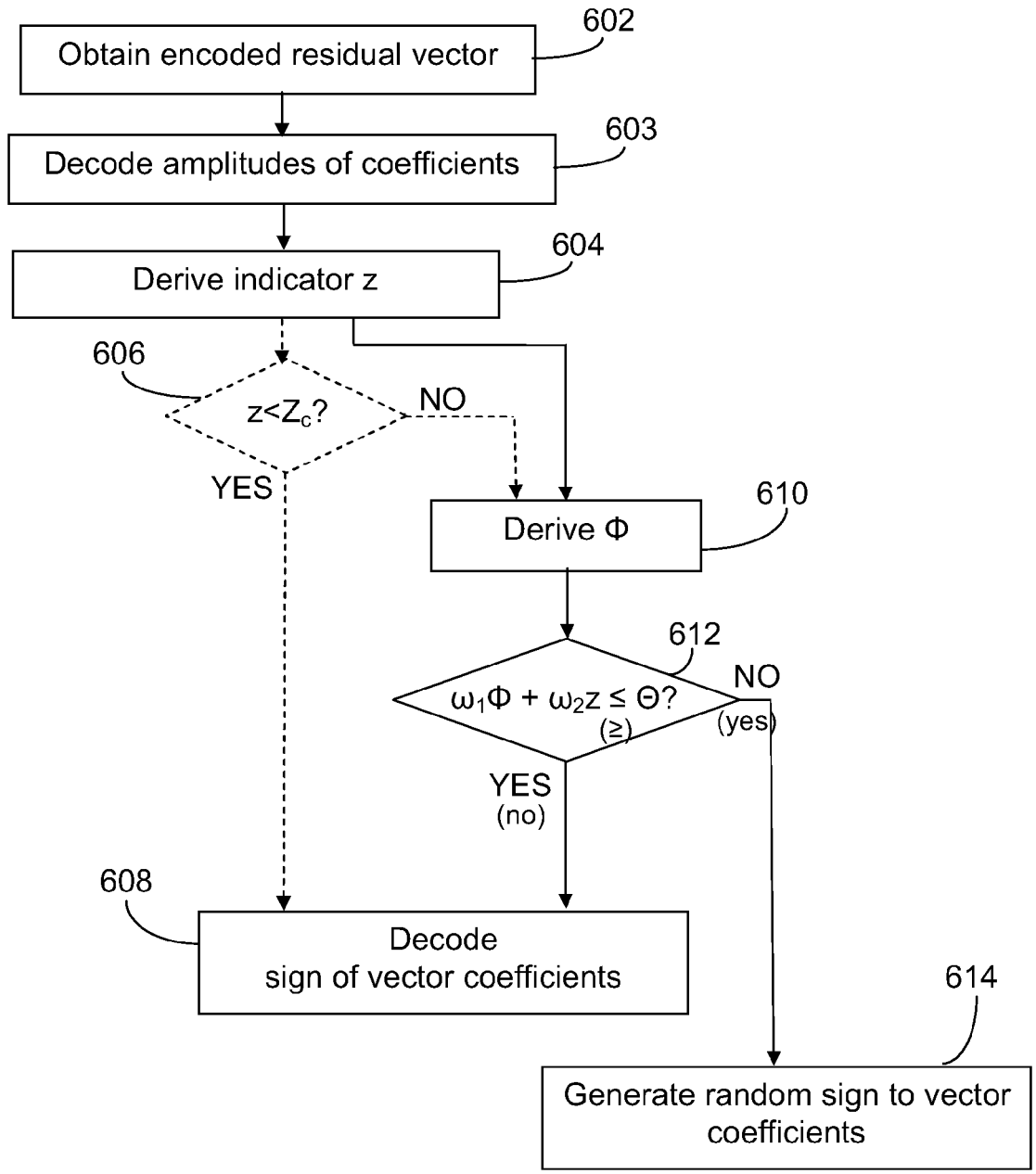
FIG. 6 is a flow chart illustrating the actions in a procedure in a transform audio decoder, according to an exemplifying embodiment.

The transform audio encoder may further be adapted to apply the predefined criterion $\omega_1\Phi+\omega_2 z \leq \Theta(b)$ for estimating whether a change of sign of at least some of the non-zero coefficients of the residual vector would be audible after reconstruction of the audio signal time segment, where $\omega_1$ and $\omega_2$ are scaling factors, which may be based on empirical experimental results; and $\Theta$ is a threshold which depends on the bitrate b of the encoder/codec Decoder A corresponding exemplifying embodiment of the procedure for decoding an encoded time segment of an audio signal will be described below, with reference to FIG. 6. The procedure is suitable for use in a transform audio decoder, such as an MDCT encoder, or other encoder where the residual vector amplitude and sign are encoded separately or sequentially.

The procedure in the transform audio decoder is similar to the procedure in the transform audio encoder, but adapted to decoding in a few aspects. The transform audio encoder is assumed to receive an encoded audio signal, which has been encoded by a transform audio encoder. An encoded residual vector of a segment of a transform vector associated with a time segment of the audio signal is obtained in an action 602. (This action is also performed in conventional transform audio decoders). The respective amplitude of the coefficients of the residual vector is decoded in an action 603 (but not yet the sign).

An indicator, z, of the position in a frequency scale of the residual vector is derived in an action 604; a measure, $\Phi$, related to the amount of structure of the residual vector is derived in an action 610; and it is determined in an action 612 whether a predefined criterion involving the measure $\Phi$, the indicator z and a predefined threshold $\Theta$, is fulfilled, thus estimating whether a change of sign of at least some of the non-zero coefficients of the residual vector would be audible after reconstruction of the audio signal time segment. The actions 604, 610 and 612 correspond to the previously described actions 404, 410 and 412 in the encoder, but in the decoder these actions are performed in order to determine whether the sign of the coefficients have been encoded or not.

In correspondence with action 406 in the encoder, it could be determined in an action 606, whether the index z of the residual vector indicates frequencies below a cross-over frequency $Z_c$, or not. When z is found to indicate frequencies below the cross-over frequency $Z_c$, the signs of the non-zero coefficients in the residual vector are decoded in an action 608; and when z is found to indicate frequencies above the cross-over frequency $Z_c$, the measure Φ is derived in action 610.

When it is determined in action 612 that the criterion is fulfilled, and thus determined that a change of sign would be audible, the signs of the non-zero coefficients of the residual vector are decoded in action 608. When it is determined in action 612 that the criterion is not fulfilled, and thus determined that a change of sign would not be audible, a respective random sign for the non-zero coefficients of the residual vector is generated in an action 614.

Below, an exemplifying transform audio decoder, adapted to perform the above described procedure for decoding a time segment of an audio signal will be described with reference to FIG. 7. The transform audio decoder could, for example be an MDCT decoder, or other decoder, where the residual vector amplitude and sign are decoded separately or sequentially.

The transform audio decoder 701 is illustrated as to communicate with other entities via a communication unit 702, which may be considered to comprise conventional means for data input and data output. The part of the transform audio decoder which is adapted for enabling the performance of the above described procedure is illustrated as an arrangement 700, surrounded by a dashed line. The transform audio encoder may further comprise other functional units 716, such as functional units providing regular decoder functions, and may further comprise one or more storage units 714.

The transform audio decoder 701, and/or the arrangement 700, could be implemented, for example by one or more of: a processor or a microprocessor and adequate software, a Programmable Logic Device (PLD) or other electronic component(s).

The transform audio decoder comprises an obtaining unit 704, which is adapted to receive or retrieve an encoded residual vector of a segment of a transform vector associated with the time segment of the audio signal. Further, the transform audio decoder comprises a decoding unit 710, which is adapted to decode the respective amplitude of the coefficients of the residual vector.

Further, the transform audio decoder comprises a deriving unit 706, which is adapted to derive an indicator, z, of the position in a frequency scale of the residual vector, and to derive a measure, Φ, related to the amount of structure of the residual vector. The transform audio decoder further comprises a determining unit 708, which is adapted to determine whether a predefined criterion involving the measure Φ, the indicator z and a predefined threshold Θ, is fulfilled, thus estimating whether a change of sign of at least some of the non-zero coefficients of the residual vector would be audible after reconstruction of the audio signal time segment, as previously described. The decoding unit 710, is further adapted to decode the respective sign of the non-zero coefficients of the residual vector when it is determined that the criterion is fulfilled, and thus that a change of sign would be audible.

The transform audio decoder further comprises a sign generator 712, which is adapted to generate a respective random sign for the non-zero coefficients of the residual vector when it is determined that the criterion described above is not fulfilled, and thus that a change of sign would not be audible.

The transform audio decoder may be adapted such that one or more of the alternatives of the procedure described above could be performed. For example, the transform audio encoder may be adapted to derive the measure, Φ, as a so-called spectral flatness measure, e.g., as $$\Phi = \frac{\exp\left(\frac{1}{N}\sum_{n=1}^{N}\log(x_n)\right)}{\frac{1}{N}\sum_{n=1}^{N}x_n}, \text{ or,}$$

in case of FPC, as:

$$\Phi_{FPC} = \frac{N_{NZP}}{N_{TP}},$$

as previously described.

The transform audio decoder may further be adapted to derive the measure, Φ, only when the indicator, z, indicates that the residual vector is associated with frequencies above a predefined cross-over frequency $Z_c$. The cross-over frequency $Z_c$ could depend on the bitrate b of the decoder/codec.

The transform audio decoder may further be adapted to apply the predefined criterion $\omega_1\Phi+\omega_2 z \leq \Theta(b)$ for estimating whether a change of sign of at least some of the non-zero coefficients of the residual vector would be audible after reconstruction of the audio signal time segment, where $\omega_1$ and $\omega_2$ are scaling factors, which may be based on empirical experimental results; and Θ is a threshold which depends on the bitrate b of the decoder/codec.

Figure 5:
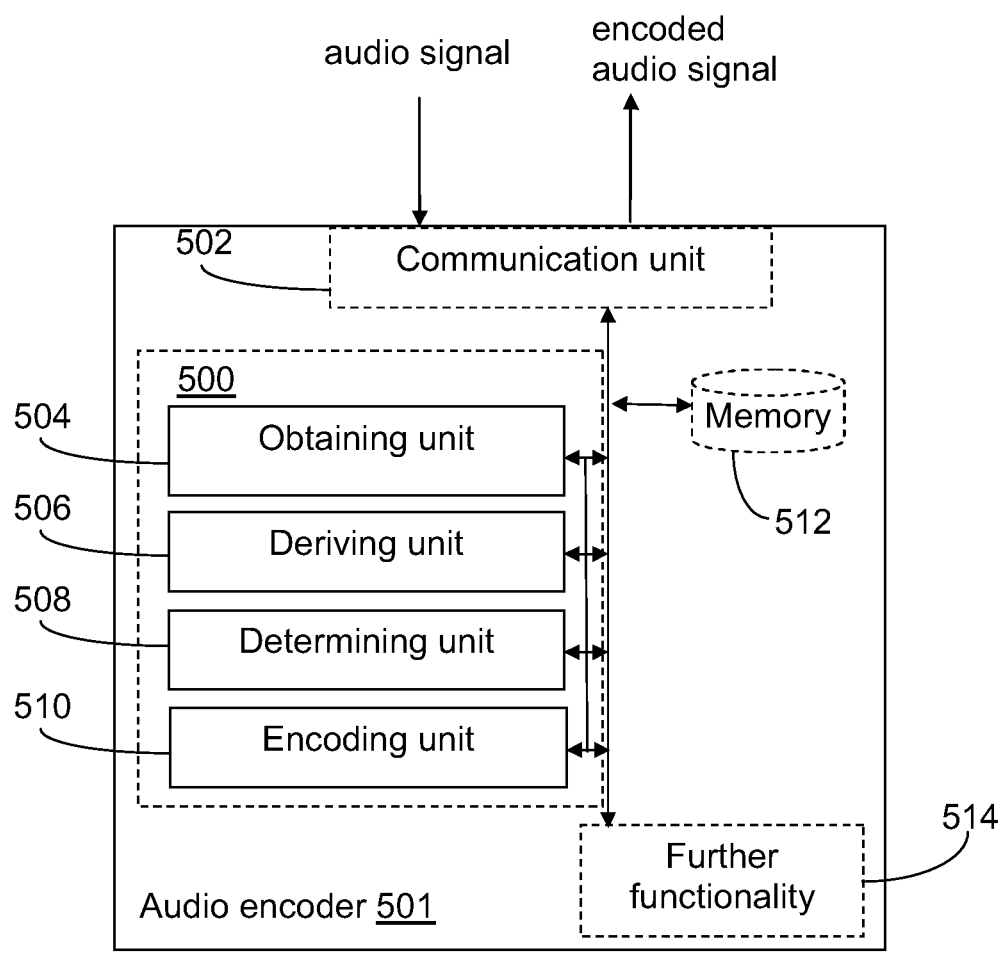
FIG. 5 is a block diagram illustrating a transform audio encoder, according to an exemplifying embodiment.
Figure 8:
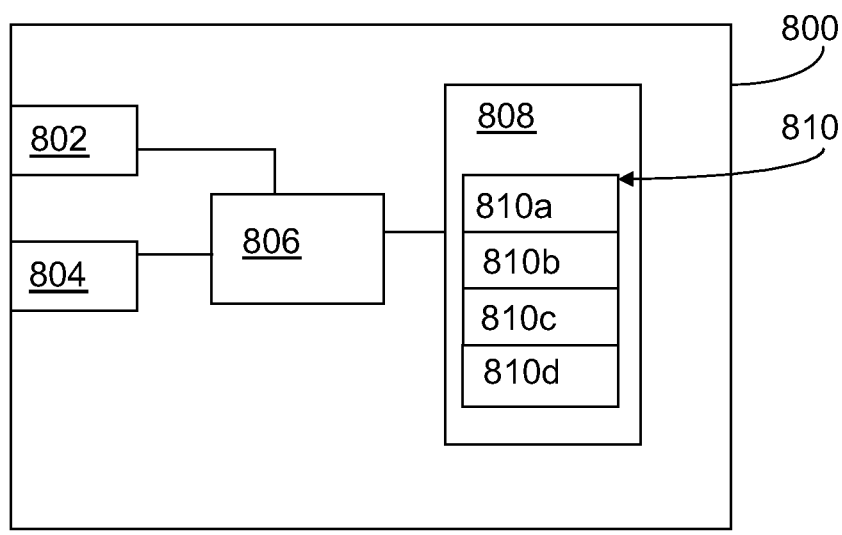
FIG. 8 is a block diagram illustrating an arrangement in a transform audio encoder, according to an exemplifying embodiment.

FIG. 8 schematically shows an embodiment of an arrangement 800 suitable for use in a transform audio encoder, which also can be an alternative way of disclosing an embodiment of the arrangement for use in a transform audio encoder illustrated in FIG. 5. Comprised in the arrangement 800 are here a processing unit 806, e.g., with a DSP (Digital Signal Processor). The processing unit 806 can be a single unit or a plurality of units to perform different steps of procedures described herein. The arrangement 800 also comprises the input unit 802 for receiving signals, such as a reference signal in a clean and a degraded version, and the output unit 804 for output signal(s), such as a quality estimate. The input unit 802 and the output unit 804 may be arranged as one in the hardware of the arrangement.

Furthermore the arrangement 800 comprises at least one computer program product 808 in the form of a non-volatile memory, such as an EEPROM, a flash memory and a hard drive. The computer program product 808 comprises a computer program 810, which comprises code means, which when run in the processing unit 806 in the arrangement 800 causes the arrangement and/or the transform audio encoder to perform the actions of the procedure described earlier in conjunction with FIG. 4.

Hence, in the exemplifying embodiments described, the code means in the computer program 810 of the arrangement 800 may comprise an obtaining module 810a for obtaining a residual vector associated with a time segment of an audio signal. The computer program comprises a deriving module 810b for deriving an indicator, z, of the position in a frequency scale of the residual vector, and to derive a measure, Φ, related to the amount of structure of the residual vector. The computer program further comprises a determining module 810c for determining whether a predefined criterion involving the measure Φ, the indicator z and a predefined threshold Θ is fulfilled. Further, the computer program comprises an encoding module 810*d* for encoding the respective amplitude of the coefficients of the residual vector, and to encode the respective sign of the coefficients of the residual vector only when it is determined that the criterion is fulfilled.

The computer program 810 is in the form of computer program code structured in computer program modules. The modules 810*a-d* essentially perform the actions of the flow illustrated in FIG. 4 to emulate the arrangement 500 illustrated in FIG. 5. In other words, when the different modules 810*a-d* are run on the processing unit 806, they correspond to the units 504-510 of FIG. 5.

Although the code means in the embodiment disclosed above in conjunction with FIG. 8 are implemented as computer program modules which when run on the processing unit causes the arrangement and/or transform audio encoder to perform steps described above in the conjunction with figures mentioned above, at least one of the code means may in alternative embodiments be implemented at least partly as hardware circuits.

Figure 7:
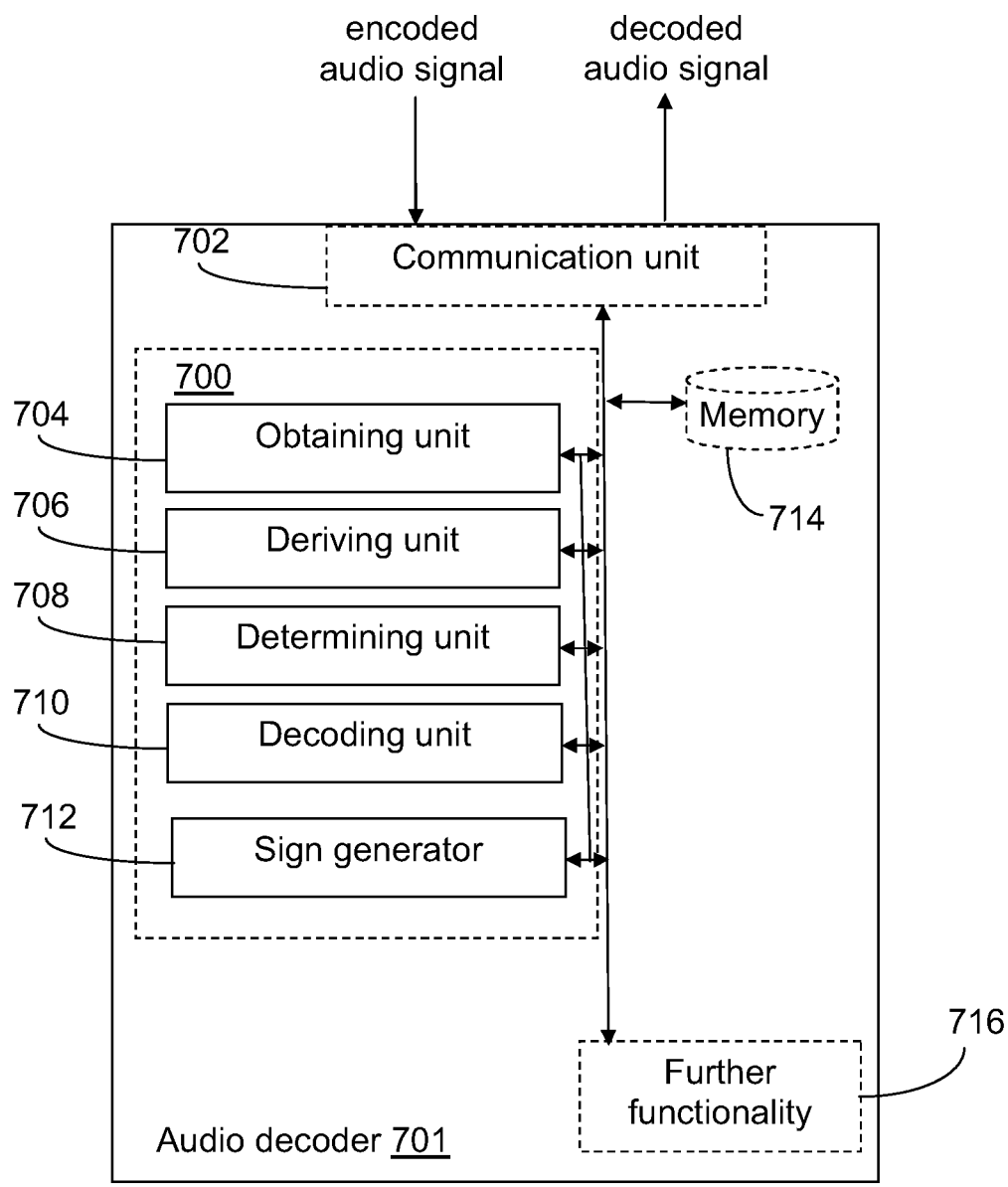
FIG. 7 is a block diagram illustrating a transform audio decoder, according to an exemplifying embodiment.

In a similar manner, an exemplifying embodiment comprising computer program modules could be described for the corresponding arrangement in a transform audio decoder illustrated in FIG. 7.

While the invention has been described with reference to specific example embodiments, the description is in general only intended to illustrate the inventive concept and should not be taken as limiting the scope of the invention. The different features of the exemplifying embodiments above may be combined in different ways according to need, requirements or preference.

REFERENCES

[1] ITU-T Rec. G.719, "Low-complexity full-band audio coding for high-quality conversational applications," 2008
[2] Mittal, J. Ashley, E. Cruz-Zeno, "Low Complexity Factorial Pulse Coding of MDCT Coefficients using Approximation of Combinatorial Functions," ICASSP 2007

The invention claimed is:

1. A method in a transform audio encoder for encoding a time segment of an audio signal, the method comprising:
deriving an indicator, z, of the position in a frequency scale of a residual vector of a segment of a transform vector associated with the time segment of the audio signal;
deriving a measure, $\Phi$, related to the amount of structure of the residual vector;
determining whether a predefined criterion involving the measure $\Phi$, the indicator z and a predefined threshold $\Theta$, is fulfilled, thus estimating whether a change of sign of at least some of the non-zero coefficients of the residual vector would be audible after reconstruction of the audio signal time segment;
wherein the predefined criterion is formulated as: $\omega_1\Phi + \omega_2 z \leq \Theta(b)$, where $\omega_1$ and $\omega_2$ are scaling factors; and $\Theta$ is a threshold that depends on the bitrate b of the encoder;
encoding the amplitude of the coefficients of the residual vector; and
encoding the sign of the non-zero coefficients of the residual vector only when it is determined that the criterion is fulfilled, and thus that a change of sign would be audible.

2. The method of claim 1, wherein the measure, $\Phi$, is a so-called spectral flatness measure.

3. The method of claim 1, wherein the scaling factors $\omega_1$ and $\omega_2$ are at least partly derived from empirical perception data.

4. The method of claim 1, wherein the threshold $\Theta$ is configured to increase with increased bitrate b of the encoder.

5. The method of claim 1, wherein the measure, $\Phi$, is only derived when the indicator, z, indicates frequencies above a predefined cross-over frequency $Z_c$, which depends on the bitrate b of the encoder.

6. The method of claim 1, wherein a Factorial Pulse Coding, FPC, scheme is used for encoding of the residual vector, wherein the measure $\Phi_{FPC}$ is derived as:

$$\Phi_{FPC} = \frac{N_{NZP}}{N_{TP}},$$

where $N_{NZP}$ is the number of non-zero positions in the residual vector and $N_{TP}$ is the total number of pulses in the residual vector.

7. A transform audio encoder for encoding a time segment of an audio signal, said encoder comprising:
a deriving unit, adapted to derive an indicator, z, of the position in a frequency scale of a residual vector of a segment of a transform vector associated with the time segment of the audio signal, and to derive a measure, $\Phi$, related to the amount of structure of the residual vector;
a determining unit, adapted to determine whether a predefined criterion involving the measure $\Phi$, the indicator z and a predefined threshold $\Theta$, is fulfilled, thus estimating whether a change of sign of at least some of the non-zero coefficients of the residual vector would be audible after reconstruction of the audio signal time segment;
wherein the predefined criterion is formulated as: $\omega_1\Phi + \omega_2 z \leq \Theta(b)$, where $\omega_1$ and $\omega_2$ are scaling factors; and $\Theta$ is a threshold that depends on the bitrate b of the encoder;
an encoding unit, adapted to encode the amplitude of the coefficients of the residual vector, and to encode the sign of the non-zero coefficients of the residual vector only when it is determined that the criterion is fulfilled, and thus that a change of sign would be audible.

8. The transform audio encoder of claim 7, further adapted to derive the measure, $\Phi$, as a so-called spectral flatness measure.

9. The transform audio encoder of claim 7, wherein the threshold $\Theta$ is configured to increase with increased bitrate b of the encoder.

10. The transform audio encoder of claim 7, further adapted to derive the measure, $\Phi$, only when the indicator, z, indicates frequencies above a predefined cross-over frequency $Z_c$, which depends on the bitrate b of the encoder.

11. The transform audio encoder of claim 7, further adapted to use a Factorial Pulse Coding, FPC, scheme for encoding of the residual vector, wherein the measure $\Phi_{FPC}$ is derived as:

$$\Phi_{FPC} = \frac{N_{NZP}}{N_{TP}},$$

where $N_{NZP}$ is the number of non-zero positions in the residual vector, and $N_{TP}$ is the total number of pulses in the residual vector.

12. A method in a transform audio decoder for decoding an encoded time segment of an audio signal, the method comprising:

decoding the amplitudes of the coefficients of a residual vector of a segment of a transform vector associated with the time segment of the audio signal;

deriving an indicator, z, of the position in a frequency scale of the residual vector, deriving a measure, $\Phi$, related to the amount of structure of the residual vector;

determining whether a predefined criterion involving the measure $\Phi$, the indicator z and a predefined threshold $\Theta$, is fulfilled, thus estimating whether a change of sign of at least some of the non-zero coefficients of the residual vector would be audible after reconstruction of the audio signal time segment;

wherein the predefined criterion is formulated as: $\omega_1\Phi + \omega_2 z \leq \Theta(b)$, where $\omega_1$ and $\omega_2$ are scaling factors; and $\Theta$ is a threshold that depends on the bitrate b of the decoder;

decoding the respective sign of the non-zero coefficients of the residual vector only when it is determined that the criterion is fulfilled, and thus that a change of sign would be audible, generating a respective random sign for the non-zero coefficients of the residual vector when it is determined that the criterion is not fulfilled, and thus that a change of sign would not be audible.

13. The method of claim 12, wherein the measure, $\Phi$, is a so-called spectral flatness measure.

14. The method of claim 12, wherein the scaling factors $\omega_1$ and $\omega_2$ are at least partly derived from empirical perception data.

15. The method of claim 12, wherein the threshold $\Theta$ is configured to increase with increased bitrate b of the decoder.

16. The method of claim 12, wherein the measure, $\Phi$, is only derived when the indicator, z, indicates frequencies above a predefined cross-over frequency $Z_c$, which depends on the bitrate b of the decoder.

17. The method of claim 12, wherein a Factorial Pulse Coding, FPC, scheme is used for decoding of the residual vector, wherein the measure $\Phi_{FPC}$ is derived as:

$$\Phi_{FPC} = \frac{N_{NZP}}{N_{TP}},$$

where $N_{NZP}$ is the number of non-zero positions in the residual vector, and $N_{TP}$ is the total number of pulses in the residual vector.

18. A transform audio decoder for decoding an encoded time segment of an audio signal, said decoder comprising:

a decoding unit, adapted to decode the amplitudes of the coefficients of a residual vector of a segment of a transform vector associated with the time segment of the audio signal;

a deriving unit, adapted to derive an indicator, z, of the position in a frequency scale of the residual vector, and to derive a measure, $\Phi$, related to the amount of structure of the residual vector;

a determining unit, adapted to determine whether a predefined criterion involving the measure $\Phi$, the indicator z and a predefined threshold $\Theta$, is fulfilled, thus estimating whether a change of sign of at least some of the non-zero coefficients of the residual vector would be audible after reconstruction of the audio signal time segment;

wherein the predefined criterion is formulated as: $\omega_1 + \omega_2 z \leq \Theta(b)$, where $\omega_1$ and $\omega_2$ are scaling factors; and $\Theta$ is a threshold that depends on the bitrate b of the decoder;

the decoding unit, being further adapted to decode the sign of the non-zero coefficients of the residual vector only when it is determined that the criterion is fulfilled, and thus that a change of sign would be audible;

a sign generator, adapted to generate a respective random sign for the non-zero coefficients of the residual vector when it is determined that the criterion is not fulfilled, and thus that a change of sign would not be audible.

19. The transform audio decoder of claim 18, further adapted to derive the measure, $\Phi$, as a so-called spectral flatness measure.

20. The transform audio decoder of claim 18, wherein the threshold $\Theta$ is configured to increase with increased bitrate b of the decoder.

21. The transform audio decoder of claim 18, further adapted to derive the measure, $\Phi$, only when the indicator, z, indicates frequencies above a predefined cross-over frequency $Z_c$, which depends on the bitrate b of the decoder.

22. The transform audio decoder of claim 18, further adapted to use a Factorial Pulse Coding, FPC, scheme for decoding of the residual vector, wherein the measure $\Phi_{FPC}$ is derived as:

$$\Phi_{FPC} = \frac{N_{NZP}}{N_{TP}},$$

where $N_{NZP}$ is the number of non-zero positions in the residual vector, and $N_{TP}$ is the total number of pulses in the residual vector.

* * * * *